United States Patent
Tsuchida et al.

(10) Patent No.: US 10,394,217 B2
(45) Date of Patent: Aug. 27, 2019

(54) MOTOR DRIVING APPARATUS

(71) Applicant: FANUC CORPORATION, Minamitsuru-gun, Yamanashi (JP)

(72) Inventors: Kunio Tsuchida, Yamanashi (JP); Taku Sasaki, Yamanashi (JP); Nobuo Hirayama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/964,481

(22) Filed: Apr. 27, 2018

(65) Prior Publication Data

US 2018/0335764 A1   Nov. 22, 2018

(30) Foreign Application Priority Data

May 18, 2017   (JP) .................................. 2017-098889

(51) Int. Cl.
*G05B 19/33*        (2006.01)
*H02P 8/14*         (2006.01)

(52) U.S. Cl.
CPC ................ *G05B 19/33* (2013.01); *H02P 8/14* (2013.01); *G05B 2219/37092* (2013.01); *G05B 2219/37181* (2013.01)

(58) Field of Classification Search
CPC .................................. H02P 8/14; G05B 19/33
USPC .................................................. 318/600, 560
See application file for complete search history.

(56) References Cited

U.S. PATENT DOCUMENTS

| 7,759,887 B2* | 7/2010 | Kiryu | ..................... H02P 6/16 |
| | | | 318/400.24 |
| 8,354,807 B2* | 1/2013 | Lee | ........................ H02P 6/20 |
| | | | 318/400.04 |
| 9,306,483 B2* | 4/2016 | Suzuki | ............... H02P 23/0004 |

FOREIGN PATENT DOCUMENTS

| JP | 2002-199768 | 7/2002 |
| JP | 2002-350455 | 12/2002 |
| JP | 2007-330090 | 12/2007 |
| JP | 2008-148368 | 6/2008 |

OTHER PUBLICATIONS

Notification of Reasons for Refusal dated Dec. 4, 2018 in corresponding Japanese Patent Application No. 2017-098889.

* cited by examiner

*Primary Examiner* — David Luo
(74) *Attorney, Agent, or Firm* — Wenderoth, Lind & Ponack, L.L.P.

(57) ABSTRACT

To provide a motor driving apparatus capable of obtaining high detection resolution irrespective of whether a frequency of a signal from a detector is high or low. A motor driving apparatus for driving a motor includes an amplifier circuit for receiving a signal from a detector for outputting information including a position and a speed of the motor as the signal, and amplifying the received signal with a set amplification factor, a frequency detecting part for detecting a frequency of the signal, and an amplification factor setting part for changing setting of the amplification factor of the amplifier circuit according to the frequency detected by the frequency detecting part.

12 Claims, 3 Drawing Sheets

MOTOR DRIVING APPARATUS

This application is based on and claims the benefit of priority from Japanese Patent Application No. 2017-098889, filed on 18 May 2017, the content of which is incorporated herein by reference.

BACKGROUND OF THE INVENTION

Field of the Invention

The present invention relates to a motor driving apparatus for driving a motor.

Related Art

A conventional motor driving apparatus controls a motor by receiving the signal output by a detector (encoder) attached to the motor, and calculating the position, the speed and the like of the motor. In the case where the signal output by the detector is a so-called A/B phase signal which is an analog sine/cosine wave pair, in general, the motor driving apparatus performs processing of: cutting high frequency noise with a low-pass filter; appropriately amplifying the amplitude thereof; performing A/D conversion to obtain a digital value; and converting the digital value into an angle of the motor to calculate the position, the speed and the like (refer to Patent Document 1, as an example).

Under an environment where high frequency noise does not greatly affect the detection resolution, the detection resolution is expected to be improved as the amplification factor thereof is higher. On the other hand, in the case where amplification is performed beyond an input range of an A/D conversion circuit, a sine wave is not reproduced accurately, whereby the detection accuracy deteriorates. Thus, conventionally, the amplification factor has been set so as not to exceed the input range even in the case of the A/B phase signal having a lower frequency.

Patent Document 1: Japanese Unexamined Patent Application, Publication No. 2002-199768

SUMMARY OF THE INVENTION

However, the amplitude of the A/B phase signal having a higher frequency is attenuated by the low-pass filter, whereby the detection resolution is degraded.

The object of the present invention is to provide a motor driving apparatus capable of obtaining high detection resolution irrespective of whether a frequency of a signal from a detector is high or low.

(1) A motor driving apparatus (for example, a motor driving apparatus 1, 21 described below) according to the present invention includes an amplifier circuit (for example, an amplifier circuit 10 described below) for receiving a signal from a detector (for example, a detector 4 described below) outputting information including a position and a speed of a motor (for example, a motor 3 described below) as the signal, and for amplifying the signal with a set amplification factor, a frequency detecting part (for example, a frequency detecting part 6, 26 described below) for detecting a frequency of the signal, and an amplification factor setting part (for example, an amplification factor setting part 7 described below) for changing setting of the amplification factor of the amplifier circuit according to the frequency detected by the frequency detecting part.

(2) In the motor driving apparatus according to (1), the signal may be a signal corresponding to a sine wave.

(3) The motor driving apparatus according to (1) or (2) may further include a frequency measuring circuit (for example, a frequency measuring circuit 13 described below) for receiving the signal from the detector to measure the frequency. The frequency detecting part (for example, the frequency detecting part 6 described below) may directly detect the frequency by using a measurement result done by the frequency measuring circuit.

(4) In the motor driving apparatus according to (2), the frequency detecting part (for example, the frequency detecting part 26 described below) may use a number of the signals each corresponding to the sine wave output by the detector per rotation of the motor and a motor rotational speed command value from a numerical control unit to the motor driving apparatus to calculate and detect the frequency.

(5) In the motor driving apparatus according to any one of (1), (2) and (4), the amplification factor setting part may change the setting of the amplification factor when the motor is stopped.

(6) In the motor driving apparatus according to any one of (1) to (5), the amplification factor setting part may have a correspondence table (for example, a correspondence table 7a described below) concerning the frequency and the amplification factor, and may set the amplification factor according to the correspondence table.

(7) In the motor driving apparatus according to any one of (1) to (6), a value of the amplification factor may be lower as the frequency is lower, and may be higher as the frequency is higher.

(8) The motor driving apparatus according to any one of (1) to (7) may further include a display part (for example, an indicator 8 described below) for displaying the amplification factor set by the amplification factor setting part.

The present invention enables to obtain high detection resolution irrespective of whether a frequency of a signal from a detector is high or low.

DETAILED DESCRIPTION OF THE INVENTION

Figure 1:
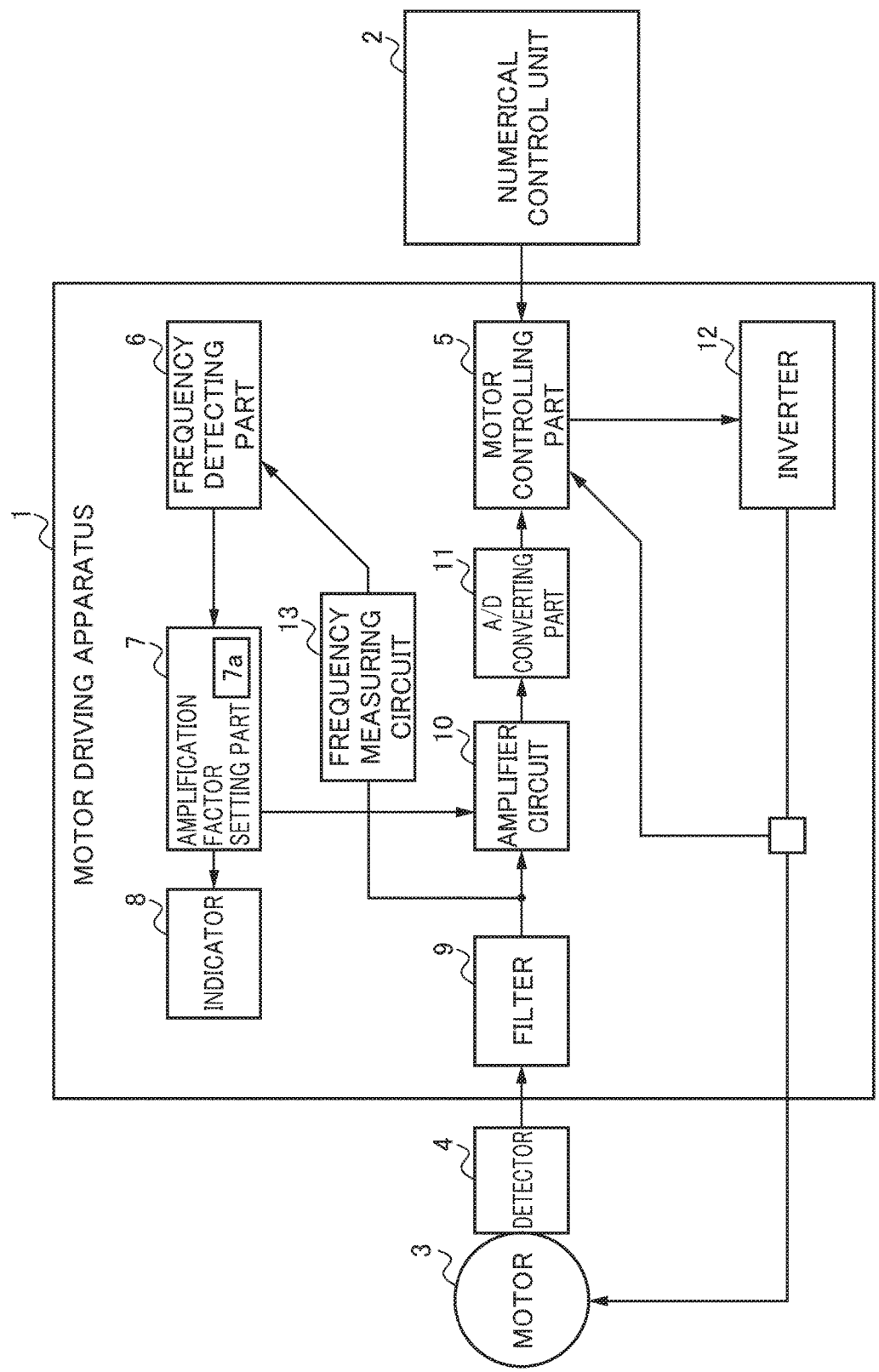
FIG. 1 is a block diagram illustrating a configuration of a motor driving apparatus according to a first embodiment.

A first embodiment of the present invention is described below in detail with reference to the drawings. In the description of a second embodiment, the same reference numerals are given to the configurations common to those of the first embodiment, and the description thereof is omitted.

First Embodiment

Figure 2:
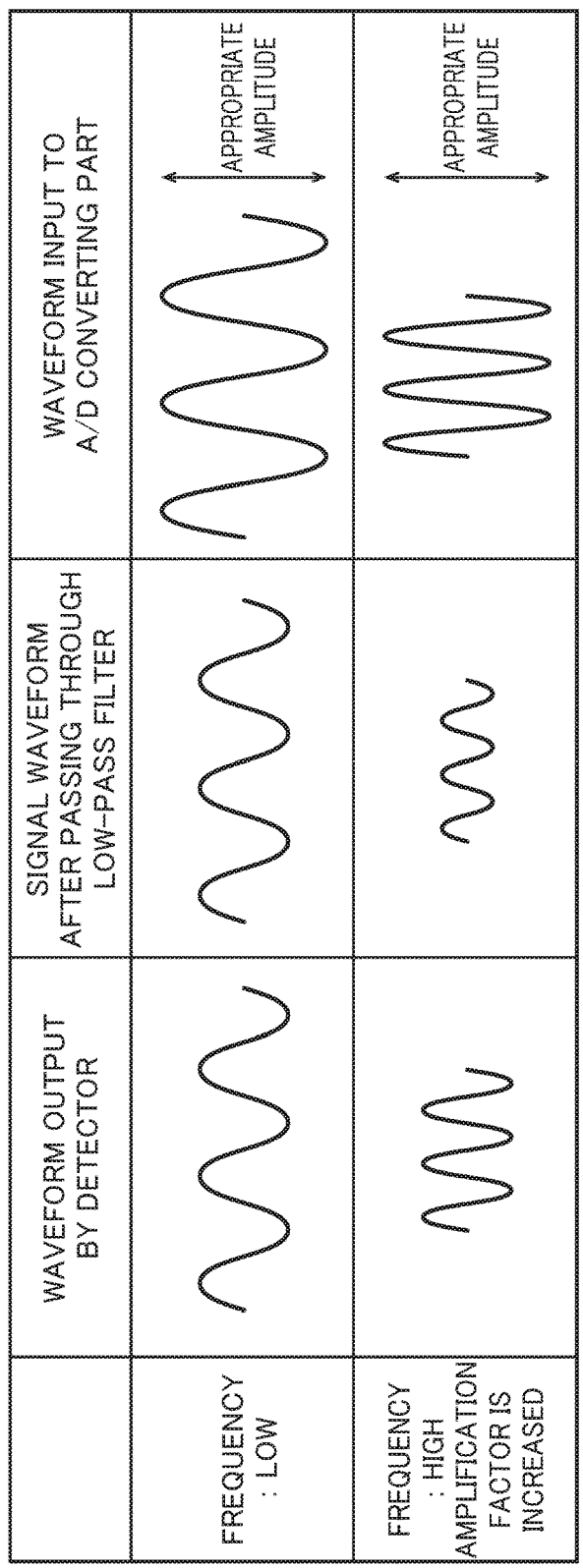
FIG. 2 is a diagram simulating a table indicating signal waveforms.

FIG. 1 is a block diagram illustrating a configuration of a motor driving apparatus 1 according to the first embodiment of the present invention. FIG. 2 is a diagram simulating a table indicating signal waveforms.

As shown in FIG. 1, the motor driving apparatus 1 according to the first embodiment drives a motor 3 for a spindle in a machine tool on the basis of a command from a numerical control unit (CNC) 2. Specifically, the motor driving apparatus 1 drives the motor 3 while feeding back, as a signal, information including the position and the speed of the motor 3 detected by a detector (encoder) 4. The motor 3 is applicable to various types of motors used for a feeding shaft or a spindle of a machine tool, an arm of an industrial machine or an industrial robot, or the like.

The motor driving apparatus 1 includes a motor controlling part 5, a frequency detecting part 6, an amplification factor setting part 7, an indicator 8, a filter 9, an amplifier circuit 10, an A/D converting part 11, an inverter 12, and a frequency measuring circuit 13.

The motor controlling part 5 gives the inverter 12 a command, which will be described below, for turning on/off a transistor on the basis of the command signal input by the numerical control unit 2, the digital signal output and fed back by the A/D converting part 11, and the alternating current output and fed back by the inverter 12.

The frequency detecting part 6 directly detects the frequency of the signal output by the detector 4 by using the frequency measurement result input by the frequency measuring circuit 13. Thereafter, the frequency detecting part 6 outputs the information on the detected frequency to the amplification factor setting part 7 as a signal.

The amplification factor setting part 7 has a correspondence table 7a concerning the frequencies of the analog signals output by the detector 4 and the amplification factors of the amplifier circuit 10. By referring to the correspondence table 7a, the amplification factor setting part 7 changes the setting of the amplification factor of the amplifier circuit 10 according to the frequency detected by the frequency detecting part 6, and also outputs as a signal the set amplification factor of the amplifier circuit 10 and inputs the signal to the indicator 8. Specifically, the amplification factor setting part 7 extracts the amplification factor of the amplifier circuit 10 corresponding to the frequency detected by the frequency detecting part 6 from the correspondence table 7a on the basis of the signal input by the frequency detecting part 6. Then, the amplification factor setting part 7 changes the setting of the amplification factor of the amplifier circuit 10 to the extracted amplification factor of the amplifier circuit 10 from the correspondence table 7a.

The amplification factor setting part 7 sets the amplification factor lower as the frequency is lower, and sets the amplification factor higher as the frequency is higher. In general, as the frequency is higher, the detection resolution is degraded because a low-pass filter (filter 9) attenuates the amplitude. Even if the amplitudes of the waveforms output by the detector are similar as shown in FIG. 2, the signal having a higher frequency attenuates more greatly in the waveform after passing through a low-pass filter (filter 9). In this point, in one aspect of the present embodiment, the amplification factor is set higher even in the case of such a higher frequency, thereby optimally keeping the amplitude of the waveform input to the A/D converting part.

Description is given again referring to FIG. 1. The indicator 8 displays the amplification factor of the amplifier circuit 10 on the basis of the signal input by the amplification factor setting part 7.

The filter 9, which is a low-pass filter, eliminates noise from the signal output by the detector 4.

The amplifier circuit 10 receives the analog signal which has been output by the detector 4 and from which the noise has been eliminated by the filter 9, and amplifies the analog signal with the amplification factor set by the amplification factor setting part 7. Then, the amplifier circuit 10 outputs the amplified analog signal and inputs the signal to the A/D converting part 11.

The A/D converting part 11 converts the analog signal input by the amplifier circuit 10 into a digital signal to output the digital signal, and feeds it back to the motor controlling part 5. In the present embodiment, a signal corresponding to a sine wave is preferably used as an analog signal.

In an example, the inverter 12, which includes a plurality of transistors and freewheel diodes connected in reversely parallel thereto, turns the transistors on/off on the basis of the command given by the motor controlling part 5, thereby supplying the alternating current to the motor 3. The inverter 12 further feeds back to the motor controlling part 5 the alternating current to be supplied to the motor 3.

The motor driving apparatus 1 described above drives the motor 3 with the alternating current input by the inverter 12. As the motor 3 is driven, the detector 4 outputs information including the position and the speed of the motor 3 as a signal, and inputs the signal to the amplifier circuit 10 via the filter 9.

The frequency measuring circuit 13 receives the analog signal which has been output by the detector 4 and from which the noise has been eliminated by the filter 9, and measures the frequency thereof. The frequency measuring circuit 13 then outputs the measured frequency as a signal and inputs the signal to the frequency detecting part 6.

As described above, in one aspect of the present embodiment, the motor driving apparatus 1 changes the setting of the amplification factor of the amplifier circuit 10 according to the frequency detected by the frequency detecting part 6. Accordingly, even in the case of a higher frequency, the motor driving apparatus 1 sets the amplification factor of the amplifier circuit 10 higher so as to optimally keep the amplitude of the waveform of the signal input to the A/D converting part 11 without attenuation, thereby enabling to obtain a higher detection resolution irrespective of whether the frequency is high or low.

Second Embodiment

Figure 3:
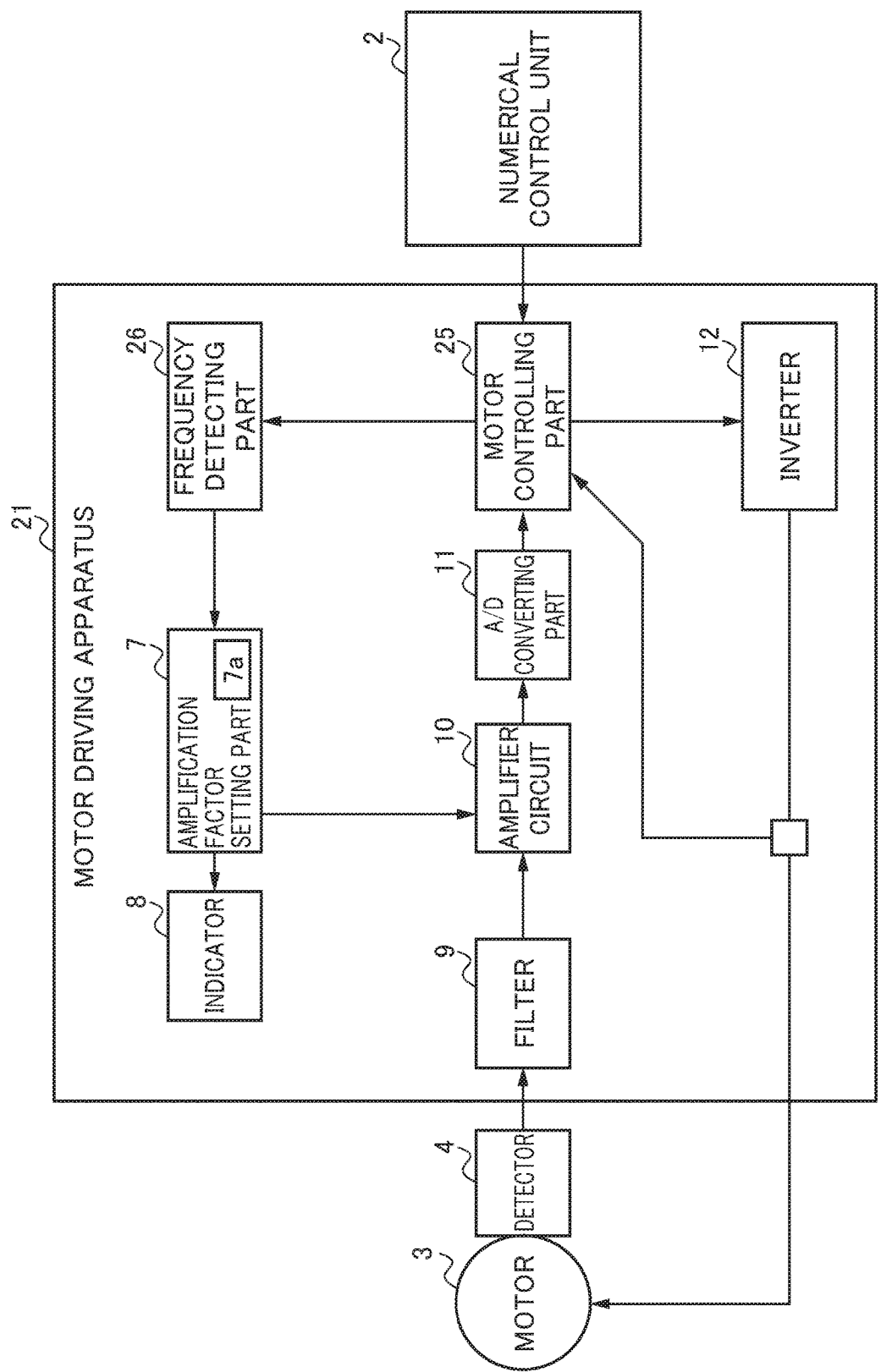
FIG. 3 is a block diagram illustrating a configuration of a motor driving apparatus according to a second embodiment.

FIG. 3 is a block diagram illustrating a configuration of a motor driving apparatus 21 according to the second embodiment of the present invention.

The motor driving apparatus 21 according to the present embodiment is different from the motor driving apparatus 1 according to the first embodiment in that the motor driving apparatus 21 calculates a frequency without directly detecting the frequency.

As shown in FIG. 3, the motor driving apparatus 21 according to the second embodiment does not include the frequency measuring circuit 13, unlike the motor driving apparatus 1 according to the first embodiment. The motor driving apparatus 21 includes a motor controlling part 25 instead of the motor controlling part 5, and also includes a frequency detecting part 26 instead of the frequency detecting part 6.

The motor controlling part 25 outputs, as a signal, the number of the signals each corresponding to a sine wave output by the detector 4 per rotation of the motor 3 and a motor rotational speed command value from the numerical control unit 2 to the motor driving apparatus 21, and inputs the signal to the frequency detecting part 26. It is noted that the number of the signals each corresponding to a sine wave output by the detector 4 per rotation of the motor 3 is identical to, for example, the number of teeth of the gear of the detector 4 to be input to the numerical control unit 2 as a parameter. That is, the signals each having a sine wave shape as many as the number of teeth of the gear are output per rotation of the motor, wherein "the number of teeth of the gear times the rotational speed of the motor is equal to the frequency of the A/B phase sine wave."

The frequency detecting part 26 uses the number of the signals each corresponding to a sine wave output by the detector 4 per rotation of the motor 3 and the motor rotational speed command value from the numerical control unit 2 to the motor driving apparatus 21, to calculate (estimate) the frequency of the signal which the detector 4 will output. Then, the frequency detecting part 26 outputs the information on the calculated frequency as a signal, and inputs the signal to the amplification factor setting part 7.

The amplification factor setting part 7 changes the setting of the amplification factor when the motor 3 is stopped. However, the timing is not limited to this. In an example, the amplification factor setting part 7 may set the amplification factor in advance by firstly calculating the amplification factor before the motor 3 is stopped, not only when the motor 3 is stopped.

The motor driving apparatus 21 according to the present embodiment produces the following effects, in addition to the effects produced by the motor driving apparatus 1 according to the above-described first embodiment. That is, the motor driving apparatus 21 according to the present embodiment, which requires no frequency measuring circuit, is capable of calculating (estimating) the signal frequency without rotating the motor 3.

Although the embodiments according to the present invention have been described above, the present invention is not limited to the above-described embodiments. The effects described in the present embodiments are listed merely as the most preferable effects produced by the present invention, and the effects produced by the present invention are not limited to those described in the present embodiments. In an example, although each of the above-described embodiments includes the indicator, the indicator is not indispensable, and alternatively another configuration with no indicator is available.

EXPLANATION OF REFERENCE NUMERALS

1, 21 MOTOR DRIVING APPARATUS
2 NUMERICAL CONTROL UNIT
3 MOTOR
4 DETECTOR
5, 25 MOTOR CONTROLLING PART
6, 26 FREQUENCY DETECTING PART
7 AMPLIFICATION FACTOR SETTING PART
7a CORRESPONDENCE TABLE
8 INDICATOR (DISPLAY PART)
9 FILTER
10 AMPLIFIER CIRCUIT
11 A/D CONVERTING PART
12 INVERTER
13 FREQUENCY MEASURING CIRCUIT

What is claimed is:

1. A motor driving apparatus for driving a motor, the motor driving apparatus comprising:
   an amplifier circuit for receiving a signal corresponding to a sine wave from a detector and amplifying the signal with a set amplification factor, the detector outputting information including a position and a speed of the motor as the signal;
   a frequency detecting part for detecting a frequency of the signal by calculating using a number of the signals each corresponding to the sine wave output by the detector per rotation of the motor and a motor rotational speed command value from a numerical control unit to the motor driving apparatus; and
   an amplification factor setting part for changing setting of the amplification factor of the amplifier circuit according to the frequency detected by the frequency detecting part.

2. The motor driving apparatus according to claim 1, wherein
   the amplification factor setting part changes the setting of the amplification factor when the motor is stopped.

3. The motor driving apparatus according to claim 1, wherein
   the amplification factor setting part has a correspondence table concerning the frequency and the amplification factor, and sets the amplification factor according to the correspondence table.

4. The motor driving apparatus according to claim 1, wherein
   a value of the amplification factor is lower as the frequency is lower, and is higher as the frequency is higher.

5. The motor driving apparatus according to claim 1, the motor driving apparatus further comprising
   a display part for displaying the amplification factor set by the amplification factor setting part.

6. A motor driving apparatus for driving a motor, the motor driving apparatus comprising:
   an amplifier circuit for receiving a signal from a detector and amplifying the signal with a set amplification factor, the detector outputting information including a position and a speed of the motor as the signal;
   a frequency detecting part for detecting a frequency of the signal; and
   an amplification factor setting part for changing setting of the amplification factor of the amplifier circuit according to the frequency detected by the frequency detecting part,
   wherein a value of the amplification factor is lower as the frequency is lower, and is higher as the frequency is higher.

7. The motor driving apparatus according to claim 6, wherein
   the signal is a signal corresponding to a sine wave.

8. The motor driving apparatus according to claim 7, wherein
   the frequency detecting part uses a number of the signals each corresponding to the sine wave output by the detector per rotation of the motor and a motor rotational speed command value from a numerical control unit to the motor driving apparatus to calculate and detect the frequency.

9. The motor driving apparatus according to claim 6, the motor driving apparatus further comprising:
   a frequency measuring circuit for receiving the signal from the detector to measure the frequency,
   wherein the frequency detecting part directly detects the frequency by using a measurement result done by the frequency measuring circuit.

10. The motor driving apparatus according to claim 6, wherein
    the amplification factor setting part changes the setting of the amplification factor when the motor is stopped.

11. The motor driving apparatus according to claim 6, wherein the amplification factor setting part has a correspondence table concerning the frequency and the amplification factor, and sets the amplification factor according to the correspondence table.

12. The motor driving apparatus according to claim 6, the motor driving apparatus further comprising:
a display part for displaying the amplification factor set by the amplification factor setting part.

\* \* \* \* \*